Sept. 2, 1941.  J. TJAARDA  2,254,552
ELECTRIC MOTOR VEHICLE
Original Filed June 13, 1938. 2 Sheets-Sheet 1
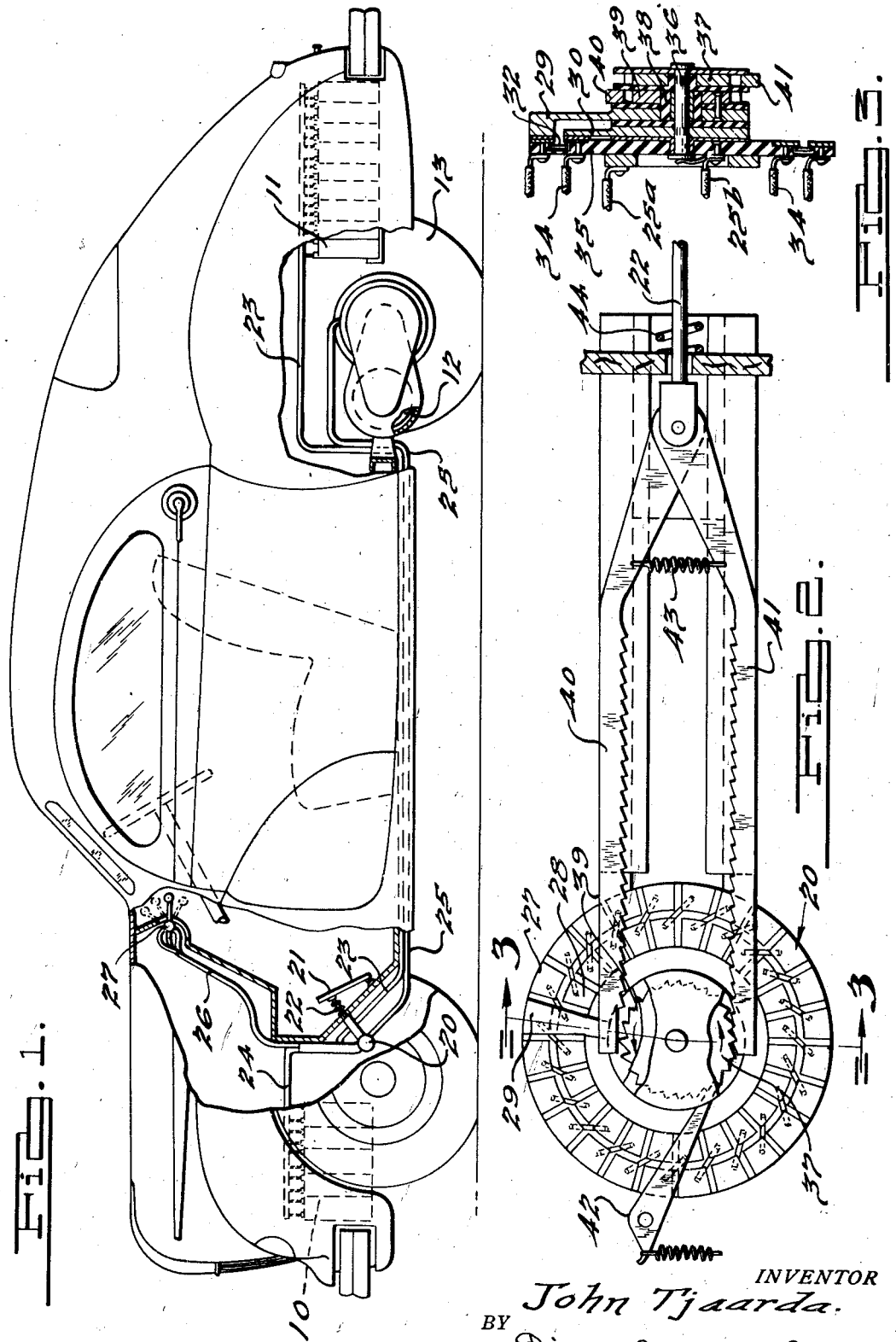
INVENTOR
John Tjaarda.
BY Dike, Calver & Gray
ATTORNEYS.

Sept. 2, 1941.　　　　J. TJAARDA　　　　2,254,552
ELECTRIC MOTOR VEHICLE
Original Filed June 13, 1938　　2 Sheets-Sheet 2
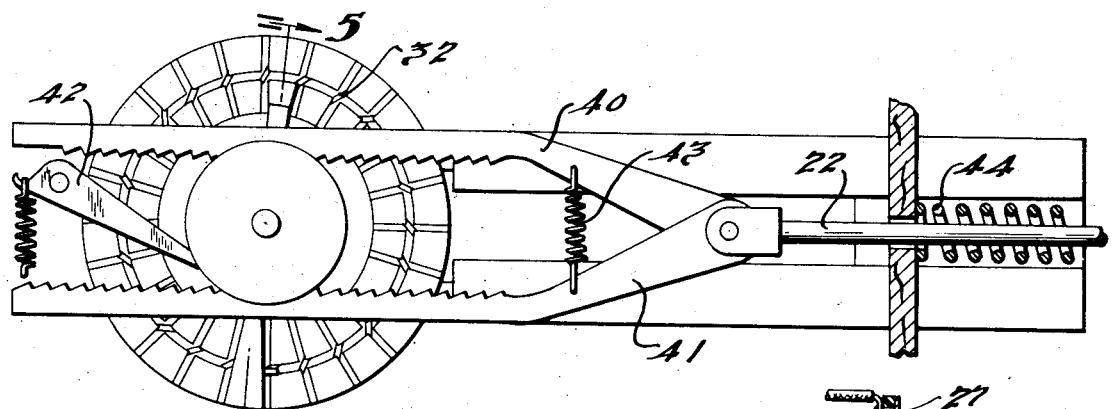
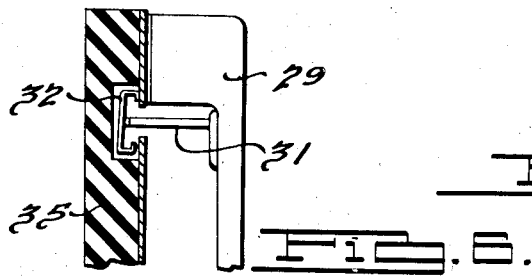
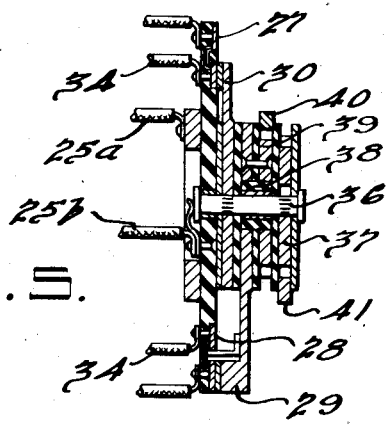
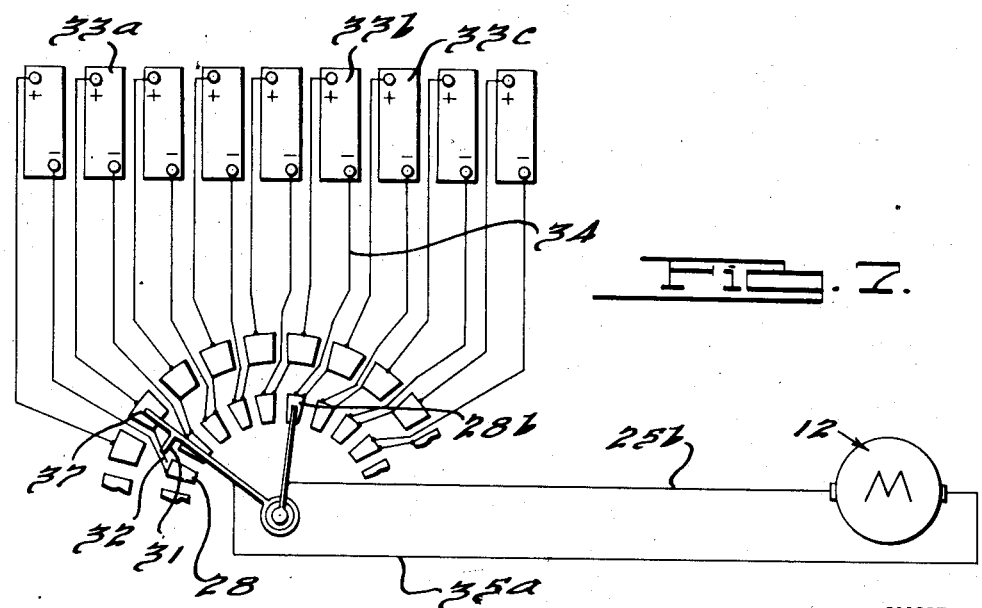
INVENTOR
John Tjaarda.
BY Dike, Calver & Gray
ATTORNEYS.

Patented Sept. 2, 1941

2,254,552

UNITED STATES PATENT OFFICE 2,254,552

ELECTRIC MOTOR VEHICLE

John Tjaarda, Detroit, Mich., assignor to Briggs Manufacturing Company, Detroit, Mich., a corporation of Michigan Original application June 13, 1938, Serial No. 213,393. Divided and this application September 21, 1939, Serial No. 295,873

8 Claims. (Cl. 172—291)

This invention relates to self-propelled vehicles and more particularly to electrically driven vehicles. The present application is a division of my copending application Serial No. 213,393, filed June 13, 1938, now Patent No. 2,208,710.

One of the objects of the present invention is to provide an improved self-propelled vehicle having a power plant capable of developing a sufficiently high starting torque on the driving wheels without the aid of a torque increasing device, such as a transmission.

Another object of the invention is to provide an improved electric motor vehicle operated from a storage battery, means being provided whereby the loads on the battery are distributed successively on all cells thereof, causing substantially uniform discharging of all of the cells.

A further object of the invention is to provide an improved self-propelled vehicle in which the disadvantages incidental to the operation of gasoline engines, such as objectionable odors, smoke, possibility of carbon monoxide poisoning and the like, are eliminated.

A still further object of the invention is to provide an improved self-propelled vehicle in which such mechanisms as a transmission, a differential, a propeller shaft and universal joints are entirely eliminated.

A still further object of the invention is to provide an improved self-propelled vehicle in which the difficulties of starting and necessity of warming up the engine are eliminated.

A still further object of the invention is to provide an electrically propelled vehicle operated by electric current derived from a storage battery adapted to be charged from time to time.

It is an added object of the present invention to provide an improved electric motor vehicle of the foregoing character, which is simple in construction, dependable in operation, is relatively inexpensive to manufacture and is easy to service and repair.

Other objects of this invention will appear in the following description and appended claims, reference being had to the accompanying drawings forming a part of this specification wherein like reference characters designate corresponding parts in the several views.

Fig. 1 is a side view, partly in section, of a motor vehicle embodying the present invention.

Fig. 2 is a side view of the foot pedal operated control device, the same being shown with its parts in positions before the pedal is pressed down for acceleration.

Fig. 3 is a sectional view taken in the direction of the arrows on the plane passing through the broken line 3—3 of Fig. 2.

Fig. 4 is a view similar in part to Fig. 2, the parts of the control device being shown in positions resulting from the pressing down of the acceleration pedal.

Fig. 5 is a sectional view taken in the direction of the arrows on the section plane passed through the line 5—5 of Fig. 4.

Fig. 6 is a sectional view illustrating the construction of one interrupter switch, a plurality of which are employed in the control device.

Fig. 7 is an electric wiring diagram illustrating the electric circuits employed in the motor vehicle and their interrelation.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a vehicle constructed in accordance with one embodiment of the present invention. The vehicle is provided with a source of electric energy, in the present instance a storage battery, divided into two sections and an electric power plant arranged at the rear of the vehicle and operatively connected to the rear axle for driving the same. The vehicle body and its front or steering axle are of substantially conventional types as used in connection with motor vehicles. It will be understood, however, that other types of vehicle bodies and other arrangements of the axles, such for instance as providing the driving axle at the front of the vehicle, may be employed and advantageously used in connection with the present invention.

Referring to the drawings, and particularly to Fig. 1, the motor vehicle shown therein resembles in its appearance a conventional motor vehicle. The sections of the storage battery 10 and 11 are arranged under the hood of the vehicle and at the rear thereof, respectively, as shown. With the present type of vehicle, the rear section 11 of the battery is larger than the front section 10, which arrangement causes the larger weight to be carried by the driving axle, thereby increasing the traction of the wheels on the road. Other suitable arrangements of the battery sections may also be used.

The electric motor used in the present embodiment is indicated by the numeral 12. Said motor is operatively mounted on the vehicle structure and preferably consists of two symmetrical armature sections rotating in a single magnetic field and separately connected to the individually sprung driving wheels 13. By virtue of such a construction independent rotation of the driving wheels is permitted, thereby giving the advantages of a conventional differential without actual use thereof. In addition, mounting of the motor 12 on the vehicle structure instead of rear axle and the individual wheel suspension decreases the unsprung weight of the body, thus giving an additional advantage. The wheel and the motor suspensions do not form a part of the present invention, and therefore no detail description thereof is deemed necessary herein.

The electrical connection of the sections 10 and 11 of the storage battery with the electric motor includes a control device 20 provided within convenient reach of the operator's foot. The device 20 is operated with the aid of a foot pedal 21 hingedly connected to the bar 22 actuating the device. All of the cells of the sections 10 and 11 are connected by means of separate conductors to the control device 20, said conductors being gathered into two cables 23 and 24, while the control device 20 is connected with the electric motor 12 by means of a two-conductor cable 25. A three-conductor cable 26 connects a switch 27 provided on the instrument panel of the vehicle with the control device, said switch permitting breaking the motor circuit for stopping the vehicle, closing the circuit for starting the same, and reversing the direction of the current through the circuit, thereby reversing the direction of rotation of the motor for backward movement of the vehicle.

The electrical control device provided in accordance with the present invention is adapted to establish and maintain electrical connections between a desired number of the battery cells and the electric motor. In the present embodiment the control device is so arranged that as the foot pedal 21 is pressed down further and further, a gradually increasing number of battery cells becomes connected to the electric motor 12. With the foot pedal pressed all the way down, all the cells are connected to the electric motor and the same delivers its maximum power. Another important feature of the present invention resides in the fact that when the pressure on the foot pedal is released the same returns to its original position disconnecting the cells from the motor. When the foot pedal 21 is pressed down again after being released, the control device operates to connect to the electric motor the cells which remained inactive during the previous application of the foot pedal. By virtue of the above described construction the motor vehicle can be accelerated to its maximum speed by the application of the foot pedal only, without shifting gears and performing other operations indispensable with the vehicle employing internal combustion engines. At the same time when driving, working of the foot pedal up and down, invariably occurring in actual driving, operates to alternate the cells and to draw the electric current not from one portion of the battery only but evenly from all cells of the battery. To perform the above functions, the electric control device may be constructed as in the present embodiment of the invention which is illustrated in Figs. 2 and 7 inclusive.

Referring to the drawings, the control device comprises a plurality of outer contact pieces or segments 27 and a plurality of inner contact pieces or segments 28, said segments being circularly arranged in pairs and insulated from each other, the number of segments of each kind corresponding to the number of cells in the battery. All the cells of the battery are connected to the control device in such a manner that each positive terminal of every individual cell is connected to one outer segment 27, while the negative terminal of the same cell is connected to the inner contact segment 28 of the same pair of segments, it being understood that the inner and the outer segments are arranged in pairs. Each of the outer contact segments of one pair is connected with the negative contact segment of the adjacent pair and, therefore, a series connection of the cells is produced. It will be understood that it is possible to provide a group of cells connected in parallel in the usual manner and then have the groups of such parallelly connected cells connected in series with the aid of the control device of the present invention. Therefore, in the wiring diagram of Fig. 7, one cell may be taken as representing a single cell as well as a group of cells correspondingly connected. Two rotating contact arms, a positive contact arm 29 and a negative contact arm 30, are adapted to slide over respective contacts and to provide electrical connections with the conductors 25a and 25b of the motor cable 25 connecting the same with the desired number of electric cells. The positive arm 29 carries a pin 31 adapted to open the interrupter switch 32 which connects the positive segment with which the arm 29 is in contact at the moment, and the negative contact segment 28.

From an examination of the wiring diagram of Fig. 7 it can be clearly seen that with the connections shown in said diagram the current will flow from the positive terminal of the cell 33a to the positive contact segment 27. Since the pin 31 keeps the interrupter switch 32 open, the flow of current to the negative contact segment 28 is prevented, and the current flows through the body of the positive contact arm 29 and a conductor 25a to the motor 12, it being understood that the arms 29 and 30 are electrically insulated from each other. From the motor 12 the current flows through the conductor 25b to the negative contact arm 30, negative contact segment 28b, conductor 34 to the negative terminal of the cell 33b. Since the positive terminal of the cell 33b is connected to the positive contact segment of the adjacent pair of segments which positive segment is connected by means of the interrupter switch with the negative segment of the next adjacent pair of segments, and the latter is connected with the negative segment of the next cell, a flow of current from cell to cell through the contact segments from the cell 33b to the cell 33a is uninterrupted. Thus, all the cells between and including the cells 33a and 33b are connected and feed the current into the motor 12. At the same time, it will be noticed that there cannot be any flow of electric current between the cell 33b and the cell 33c, since there is no electrical connection between the negative contact segment 28b and the negative terminal of the cell 33c. In other words, only those cells which are included between the contact arms 29 and 30 are connected to the motor. The wider the arms 29 and 30 are spread, the larger is the number of cells connected to the motor. If both arms 29 and 30 bear on the respective contact segments of a single pair of segments, practically no flow of current through the motor takes place.

In accordance with the present invention means are provided to spread the arms 29 and 30 in response to the pressure on the pedal 21. As shown in Figs. 2 and 3, the contact segments 27 and 28 are mounted on an insulated round plate 35 at the center of which there is provided a shaft 36 on which the arm 30 is mounted for rotation therewith. A ratchet wheel 37 is securely mounted on the shaft 36. On the same shaft 36 there is rotatably mounted a sleeve 38 rotatable independently of said shaft, on which sleeve there are securely mounted the positive contact arm 29 and a second ratchet wheel 39. Because of such a construction the ratchet wheels 37 and 39 connected to the contact arms 30 and 29, respectively, can rotate independently of each other.

To the foot pedal bar 22 there are hingedly connected two racks 40 and 41. The rack 40 engages the wheel 39 and is adapted to rotate the same when the bar 22 is pushed down. The rack 41 is adapted to engage the ratchet wheel 37 and to rotate the same when the bar 22 moves upward. It should be noted that because of the provision of a dog 42 both wheels can rotate only in one direction, counterclockwise in Fig. 2, and therefore the contact arms also move in one direction only. The constant engagement of the racks with the respective wheels is ensured by the provision of a spring 43 which maintains the racks in constant contact with the wheels.

In Fig. 2 both contact arms 29 and 30 are shown contacting the same pair of contact segments and therefore there is practically no flow of electric current through the motor of the vehicle, and the same remains stationary. As the pedal 21 is pushed down, the rack 40 engages the wheel 39 and rotates the same in the counterclockwise direction moving the positive contact arm 29 over a number of positive contact segments, thereby connecting the cells connected to the contact segments included between the negative contact arm 39 and the positive contact 29 to the motor 12. The further the pedal 21 is pushed down, the greater is the number of cells connected to the motor. The operative stroke of the pedal 21 is so selected that when said pedal is pushed all the way down, the positive contact arm makes a practically complete revolution and contacts the positive contact segment adjacent or nearly adjacent to the pair of contact segments, the negative segment of which is in contact with the negative contact arm 30. As the rack 40 moves downward (to the left in Fig. 2), the rack 41 also moves downward but since the teeth on said rack 41 are cut in the opposite direction to the teeth on the rack 40, the rack 101 simply rides over the ratchet wheel 37 without producing any rotation thereof, any tendency of rotation of the wheel 37 being resisted by the dog 42.

An important advantage of the present invention results from the fact that as the pedal 21 is released and returns to its original position because of the pressure exerted thereon by a spring 44, the positive contact arm 29 does not return to its original position but remains in the position into which it was moved by the application of the foot pedal, the decrease in the flow of current to the electric motor 12 being achieved by causing the negative contact arm 30 to move toward the positive contact arm 29 and to contact the negative segment of the pair of segments, the positive segment of which is contacted at the moment by the positive contact arm 29. It can be clearly seen from an examination of the drawings that when the bar 22 moves upward (to the right in Fig. 2), the ratchet wheel 39 connected to the positive contact 29 remains stationary, since the teeth of the rack 40, because of their direction, ride over the teeth of said ratchet wheel 39. On the other hand, the rack 41 in its upward motion rotates the ratchet wheel 37 moving the negative contact arm 30 in the counterclockwise direction. Since the return stroke of the bar 22 must be equal to the prior downward stroke thereof, the negative contact arm 30 will be rotated through the same angle and therefore it will come into the position to contact the negative segment of that pair of contacts, the positive segment of which is in contact at the moment with the positive arm 29. In the succeeding application of the foot pedal, the positive arm 29 will be moved forward over the remaining contact segments and therefore the current will be drawn not from the cells which were connected to the motor in the prior application of the foot pedal but to the cells which remained inactive during said application. By virtue of such a construction the current is drawn evenly from all cells of the battery and the same is evenly discharged. The above is an important advantage of the present invention since drawing current from the first few cells on every application of the foot pedal and at the same time leaving other cells inactive under average driving conditions produces a very objectionable uneven discharge of the battery and inefficient use thereof. It will require a much larger battery for the same performance of the motor vehicle than it is possible to use in connection with a motor vehicle constructed in accordance with the present invention.

The construction of the interrupter switch 32 is shown in detail in Fig. 6 and the operation of said switch is clear from an examination of said figure in the light of the prior description.

I claim:

1. In an electric motor vehicle, a battery composed of a plurality of electric cells, an electric motor, a control device including a plurality of pairs of contact pieces, each pair including a positive and a negative contact connected to the positive and to the negative terminal of a respective cell, a plurality of interrupter switches normally connecting the positive contact of one pair of contacts to the negative contact of the adjacent pair, whereby all of the cells are connected in series, two movable contact arms electrically connected to said motor, one of said arms adapted to make successive contacts with the positive contact pieces and the other with the negative contact pieces, and means operable by one of said arms, said means being adapted to open the interrupter switch connecting the contact piece on which said arm bears with the piece of the adjacent pair, whereby only the cells connected to the contact pieces included between said arms are connected to the motor.

2. In an electric motor vehicle, a battery composed of a plurality of electric cells, an electric motor, a control device including a plurality of pairs of contact pieces, each pair including a positive and a negative contact connected to the positive and to the negative terminal of a respective cell, a plurality of interrupter switches normally connecting the positive contact of one pair of contacts to the negative contact of the adjacent pair, whereby all of the cells are connected in series, two movable contact arms electrically connected to said motor, one of said arms adapted to make successive contacts with the positive contact pieces and the other with the negative contact pieces, a member carried by one of the arms and adapted to open the interrupter switch connecting the contact piece upon which said arms bear at the moment with the contact piece of the adjacent pair.

3. In an electric motor vehicle, a battery composed of a plurality of electric cells, an electric motor, a control device including a plurality of pairs of contact pieces, each pair including a positive and a negative contact connected to the positive and to the negative terminal of a respective cell, a plurality of interrupter switches normally connecting the positive contact of one pair of contacts to the negative contact of the adjacent pair, whereby all of the cells are connected in series, two movable contact arms electrically connected to said motor, one of said arms adapted to make successive contacts with the positive contact pieces and the other with the negative contact pieces, a member carried by one of the arms and adapted to open the interrupter switch connecting the contact piece upon which said arms bear at the moment with the contact piece of the adjacent pair, and pedal controlled means for operating said control device.

4. In an electric motor vehicle, a battery composed of a plurality of electric cells, an electric motor, a control device including a plurality of pairs of contact pieces, each pair including a positive and a negative contact connected to the positive and to the negative terminal of a respective cell, a plurality of interrupter switches normally connecting the positive contact of one pair of contacts to the negative contact of the adjacent pair, whereby all of the cells are connected in series, two movable contact arms electrically connected to said motor, one of said arms adapted to make successive contacts with the positive contact pieces and the other with the negative contact pieces, a member carried by one of the arms and adapted to open the interrupter switch connecting the contact piece upon which said arms bear at the moment with the contact piece of the adjacent pair, and means whereby said arms are moved in one direction.

5. In an electric motor vehicle, a battery composed of a plurality of electric cells, an electric motor, a control device including a plurality of pairs of contact pieces, each pair including a positive and a negative contact connected to the positive and to the negative terminal of a respective cell, a plurality of interrupter switches normally connecting the positive contact of one pair of contacts to the negative contact of the adjacent pair, whereby all of the cells are connected in series, two movable contact arms electrically connected to said motor, one of said arms adapted to make successive contacts with the positive contact pieces and the other with the negative contact pieces, a member carried by one of the arms and adapted to open the interrupter switch connecting the contact piece upon which said arms bear at the moment with the contact piece of the adjacent pair, a foot pedal for moving one of said contact arms through a desirable number of contact pieces to connect the corresponding number of cells to said motor, and means bringing the second of said arms to the first arm when said pedal is released.

6. In an electric motor vehicle, a battery composed of a plurality of electric cells; an electric motor; a control device comprising a corresponding plurality of positive contact segments circularly arranged and connected to the positive terminals of the cells, respectively, a corresponding plurality of negative contact segments connected to the negative terminals of said cells, respectively, arranged circularly and in pairs with said positive segments, a corresponding plurality of interrupter switches connecting the adjacent pairs of segments in series, two movable contact arms electrically connected to the positive and the negative terminals of said motor, respectively, and adapted to contact said segments to connect a desirable number of cells to said motor, and means adapted to operate said interrupter switches to open the switch on which one of said arms bears at a particular moment.

7. In an electric motor vehicle, a battery composed of a plurality of electric cells; an electric motor; a control device comprising a corresponding plurality of positive contact segments circularly arranged and connected to the positive terminals of the cells, respectively, a corresponding plurality of negative contact segments connected to the negative terminals of said cells, respectively, arranged circularly and in pairs with said positive segments, a corresponding plurality of interrupter switches connecting the adjacent pairs of segments in series, two movable contact arms electrically connected to the positive and the negative terminals of said motor, respectively, and adapted to move around over said segments to establish electric contact therewith, and means carried by one of said arms and adapted to open the interrupter switch connecting the contact segment on which said arm bears with the segment of the adjacent pair to connect the cells included between said arms to said motor.

8. In an electric motor vehicle, a battery composed of a plurality of electric cells; an electric motor; a control device comprising a corresponding plurality of positive contact segments circularly arranged and connected to the positive terminals of the cells, respectively, a corresponding plurality of negative contact segments connected to the negative terminals of said cells, respectively, arranged circularly and in pairs with said positive segments, a corresponding plurality of interrupter switches connecting the adjacent pairs of segments in series, two movable contact arms electrically connected to the positive and the negative terminals of said motor, respectively, and adapted to move around over said segments to establish electric contact therewith, means carried by one of said arms and adapted to open the interrupter switch connecting the contact segment on which said arm bears with the segment of the adjacent pair to connect the cells included between said arms to said motor, a foot pedal for moving one of said arms forward over a number of segments when the pedal is pressed, and means retaining said first arm at the place reached to bring the second arm thereto when the pedal is released.

JOHN TJAARDA.